(12) United States Patent
Jing (10) Patent No.: US 10,095,791 B2
(45) Date of Patent: Oct. 9, 2018

(54) INFORMATION SEARCH METHOD AND APPARATUS

(71) Applicant: Huawei Device (Dongguan) Co., Ltd., Dongguan (CN)

(72) Inventor: Hao Jing, Shenzhen (CN)

(73) Assignee: Huawei Devices (Dongguan) Co., Ltd., Dongguan (CN)

( * ) Notice: Subject to any disclaimer, the term of this patent is extended or adjusted under 35 U.S.C. 154(b) by 256 days.

(21) Appl. No.: 14/895,961

(22) PCT Filed: Apr. 10, 2014

(86) PCT No.: PCT/CN2014/075033
§ 371 (c)(1),
(2) Date: Dec. 4, 2015

(87) PCT Pub. No.: WO2015/154270
PCT Pub. Date: Oct. 15, 2015

(65) Prior Publication Data
US 2016/0117392 A1    Apr. 28, 2016

(51) Int. Cl.
*G06F 17/00* (2006.01)
*G06F 17/30* (2006.01)

(52) U.S. Cl.
CPC ........ *G06F 17/30864* (2013.01); *G06F 17/30* (2013.01); *G06F 17/30876* (2013.01); *G06F 17/30884* (2013.01)

(58) Field of Classification Search
CPC ........... G06F 17/30884; G06F 17/3033; G06F 17/30345; G06F 17/30864; G06F 17/30873
See application file for complete search history.

(56) References Cited

U.S. PATENT DOCUMENTS

| | | |
|---|---|---|
| 6,460,060 B1 | 10/2002 | Maddalozzo et al. |
| 6,950,861 B1 | 9/2005 | Amro et al. |
| 2002/0091683 A1 | 7/2002 | Kurakake et al. |
| 2011/0289068 A1* | 11/2011 | Teevan ............. G06F 17/30867 707/709 |
| 2012/0150857 A1 | 6/2012 | Imai |
| 2015/0199353 A1 | 7/2015 | Wu |

FOREIGN PATENT DOCUMENTS

| | | |
|---|---|---|
| CN | 102662940 A | 9/2012 |
| CN | 102722481 A | 10/2012 |
| CN | 102945259 A | 2/2013 |
| CN | 103246746 A | 8/2013 |
| EP | 1215595 A2 | 6/2002 |

* cited by examiner

*Primary Examiner* — Truong Vo
(74) *Attorney, Agent, or Firm* — Leydig, Voit & Mayer, Ltd.

(57) ABSTRACT

Embodiments of the present invention disclose an information search method and apparatus, where the method includes: acquiring a query keyword input by a user and a bookmark website address; acquiring a target bookmark website address according to the query keyword and the bookmark website address, where a page to which the target bookmark website address points includes the query keyword; and displaying a page label item corresponding to the target bookmark website address. By using the present invention, a website address that is actually required by a user can be more comprehensively and accurately found, so as to improve query efficiency and accuracy.

11 Claims, 5 Drawing Sheets

INFORMATION SEARCH METHOD AND APPARATUS

CROSS-REFERENCE TO RELATED APPLICATION

This application is a National Stage of International Patent Application No. PCT/CN2014/075033, filed on Apr. 10, 2014, which is hereby incorporated by reference in its entirety.

TECHNICAL FIELD

The present invention relates to the field of communications technologies, and in particular, to an information search method and apparatus.

BACKGROUND

When using a browser to browse a web page, a user can record and keep, by using a favorites folder function of the browser, a website address that the user is fond of or a website address that the user commonly uses. As a quantity of browsed web pages increases, a quantity of website addresses saved by the user also increases. In this case, the user can search the favorites folder and browse history for a related keyword to find a website address required by the user.

In the prior art, a browser can search a web page name corresponding to each website address in the favorites folder and the browse history, so as to detect whether a related keyword is included in the web page name; when a web page name includes the related keyword, the browser displays the web page name. However, when a web page name does not include the related keyword, but a web page corresponding to the web page name includes the related keyword, the browser cannot display the web page name. Therefore, search accuracy of a search method in the prior art is affected to some extent.

SUMMARY

Embodiments of the present invention provide an information search method and apparatus, which can more comprehensively and accurately find a website address actually required by a user, so as to improve search accuracy.

According to a first aspect of the present invention, an information search method is provided, including:

acquiring a query keyword input by a user and a bookmark website address;

acquiring a target bookmark website address according to the query keyword and the bookmark website address, where a page to which the target bookmark website address points includes the query keyword; and displaying a page label item corresponding to the target bookmark website address.

In a first possible implementation manner, the acquiring a target bookmark website address according to the query keyword and the bookmark website address includes:

when a page to which the bookmark website address points is not loaded or a page to which the bookmark website address points cannot be successfully loaded, sending search request information that is associated with both the query keyword and the bookmark website address to a search server;

receiving a search result that is obtained by the search server by searching the page to which the bookmark website address points; and determining, when it is determined, according to the search result, that the page to which the bookmark website address points includes the query keyword, that the bookmark website address corresponding to the page including the query keyword is the target bookmark website address.

With reference to the first possible implementation manner of the first aspect, in a second possible implementation manner, the sending search request information that is associated with both the query keyword and the bookmark website address to a search server includes:

separately creating, for each of the bookmark website address, a first search request that is associated with the query keyword; and separately sending the created first search request to the search server, where the first search request includes at least: an address of the search server, one bookmark website address, and the query keyword.

With reference to the first possible implementation manner of the first aspect, in a third possible implementation manner, the sending search request information that is associated with both the query keyword and the bookmark website address to a search server includes:

creating, for all bookmark website addresses, a second search request that is associated with the query keyword; and sending the second search request to the search server, where the second search request includes at least: an address of the search server, the query keyword, and all the bookmark website addresses.

With reference to the first possible implementation manner of the first aspect, or the second possible implementation manner of the first aspect, or the third possible implementation manner of the first aspect, in a fourth possible implementation manner, the determining, when it is determined, according to the search result, that the page to which the bookmark website address points includes the query keyword, that the bookmark website address corresponding to the page including the query keyword is the target bookmark website address includes:

determining whether a network address exists in the search result returned by the search server, where the network address is an address that is found by the search server and is corresponding to the page including the query keyword; and if it is determined that the network address exists, determining whether the network address in the search result matches the bookmark website address; and determining that the bookmark website address that matches the network address in the search result is the target bookmark website address.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner, after the displaying a page label item corresponding to the target bookmark website address, the method further includes:

when a click operation on the page label item is detected, jumping to the page to which the target bookmark website address points; or when a click operation on the page label item is detected, jumping to a page to which a web page snapshot address corresponding to the target bookmark website address points.

According to a second aspect of the present invention, an information search apparatus is provided, including:

a first acquiring module, configured to acquire a query keyword input by a user and a bookmark website address;

a second acquiring module, configured to acquire a target bookmark website address according to the query keyword and the bookmark website address, where a page to which the target bookmark website address points includes the query keyword; and a displaying module, configured to display a page label item corresponding to the target bookmark website address.

In a first possible implementation manner, the second acquiring module includes:

a sending unit, configured to send, when a page to which the bookmark website address points is not loaded or a page to which the bookmark website address points cannot be successfully loaded, search request information that is associated with both the query keyword and the bookmark website address to a search server;

a result receiving unit, configured to receive a search result that is obtained by the search server by searching the page to which the bookmark website address points; and a determining unit, configured to determine, when it is determined, according to the search result, that the page to which the bookmark website address points includes the query keyword, that the bookmark website address corresponding to the page including the query keyword is the target bookmark website address.

With reference to the first possible implementation manner of the second aspect, in a second possible implementation manner, the sending unit includes:

a first creating subunit, configured to separately create, for each of the bookmark website address, a first search request that is associated with the query keyword; and a first request sending subunit, configured to separately send the created first search request to the search server, where the first search request includes at least: an address of the search server, one bookmark website address, and the query keyword.

With reference to the first possible implementation manner of the second aspect, in a third possible implementation manner, the sending unit includes:

a second creating subunit, configured to create, for all bookmark website addresses, a second search request that is associated with the query keyword; and a second request sending subunit, configured to send the second search request to the search server, where the second search request includes at least: an address of the search server, the query keyword, and all the bookmark website addresses.

With reference to the first possible implementation manner of the second aspect, or the second possible implementation manner of the second aspect, or the third possible implementation manner of the second aspect, in a fourth possible implementation manner, the determining unit includes:

a first judging subunit, configured to determine whether a network address exists in the search result returned by the search server, where the network address is an address that is found by the search server and is corresponding to the page including the query keyword;

a second judging subunit, configured to determine, if the first judging subunit determines that the network address exists, whether the network address in the search result matches the bookmark website address; and a target determining subunit, configured to determine that the bookmark website address that matches the network address in the search result is the target bookmark website address.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner, the apparatus further includes:

a first jumping module, configured to, when a click operation on the page label item is detected, implement a jump to the page to which the target bookmark website address points; and a second jumping module, configured to, when a click operation on the page label item is detected, implement a jump to a page to which a web page snapshot address corresponding to the target bookmark website address points.

According to a third aspect of the present invention, a computer storage medium is provided, where the computer storage medium stores a program, where a part of or all steps in the information search method according to the first aspect are included when the program is executed.

According to a fourth aspect of the present invention, an information search apparatus is provided, including: a processor, a communications interface, and a memory, where the communications interface is configured to communicate with a search server;

the memory is configured to store a program; and the processor is configured to execute the program, so as to implement:

acquiring a query keyword input by a user and a bookmark website address;

acquiring a target bookmark website address according to the query keyword and the bookmark website address, where a page to which the target bookmark website address points includes the query keyword; and displaying a page label item corresponding to the target bookmark website address.

In a first possible implementation manner, the processor is specifically configured to:

when a page to which the bookmark website address points is not loaded or a page to which the bookmark website address points cannot be successfully loaded, send search request information that is associated with both the query keyword and the bookmark website address to the search server;

receive a search result that is obtained by the search server by searching the page to which the bookmark website address points; and determine, when it is determined, according to the search result, that the page to which the bookmark website address points includes the query keyword, that the bookmark website address corresponding to the page including the query keyword is the target bookmark website address.

With reference to the first possible implementation manner of the fourth aspect, in a second possible implementation manner, the processor is specifically configured to:

separately create, for each of the bookmark website address, a first search request that is associated with the query keyword; and separately send the created first search request to the search server, where the first search request includes at least: an address of the search server, one bookmark website address, and the query keyword.

With reference to the first possible implementation manner of the fourth aspect, in a third possible implementation manner, the processor is specifically configured to:

create, for all bookmark website addresses, a second search request that is associated with the query keyword; and send the second search request to the search server, where the second search request includes at least: an address of the search server, the query keyword, and all the bookmark website addresses.

With reference to the first possible implementation manner of the fourth aspect, or the second possible implementation manner of the fourth aspect, or the third possible implementation manner of the fourth aspect, in a fourth possible implementation manner, the processor is specifically configured to:

determine whether a network address exists in the search result returned by the search server, where the network address is an address that is found by the search server and is corresponding to the page including the query keyword; and if it is determined that the network address exists, determine whether the network address in the search result matches the bookmark website address; and determine that the bookmark website address that matches the network address in the search result is the target bookmark website address.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, in a fifth possible implementation manner, the processor is further configured to:

when a click operation on the page label item is detected, implement a jump to the page to which the target bookmark website address points; or when a click operation on the page label item is detected, implement a jump to a page to which a web page snapshot address corresponding to the target bookmark website address points.

It can be seen from the foregoing that in the embodiments of the present invention, a target bookmark website address is acquired; because a page to which the target bookmark website address points includes the query keyword, the target bookmark website address that is finally obtained by searching is more comprehensive and accurate, so that a user can actually find a required website address, thereby improving query efficiency and search accuracy.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
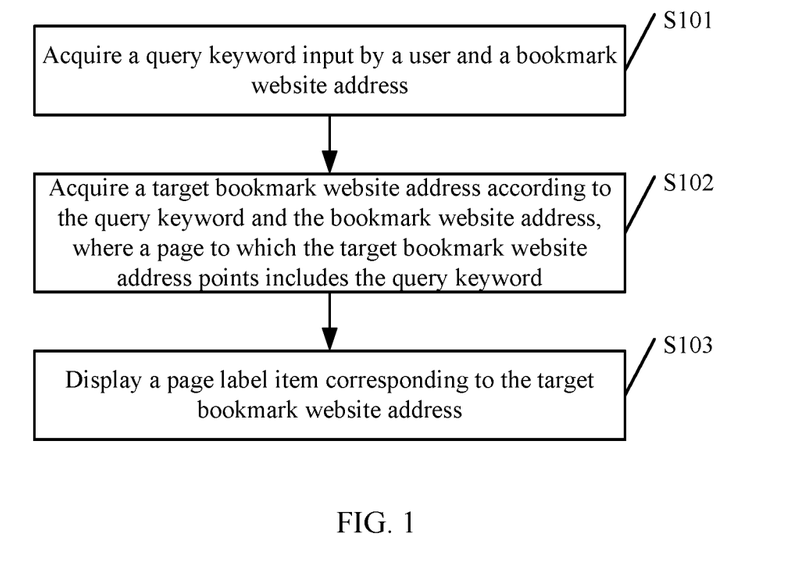
FIG. 1 is a schematic flowchart of an information search method according to an embodiment of the present invention.

Refer to FIG. 1, which is a schematic flowchart of an information search method according to an embodiment of the present invention. The method includes:

S101. Acquire a query keyword input by a user and a bookmark website address.

Specifically, when the user inputs the query keyword on a search interface of a browser, the browser may acquire the query keyword input by the user and the bookmark website address, where the bookmark website address may be all website addresses in a favorites folder or browse history of the browser or both, and the bookmark website address may also come from another area that is in a user terminal and stores a website address, such as a website address stored in a short message service message. The query keyword may be a query keyword input by the user; for example, the user may input a keyword, such as "smart phone" and "tablet computer" so as to find a bookmark website address that is associated with the keyword "smart phone", "tablet computer", and the like. The browser may further provide a search option for the user, so that the user performs a search in the favorites folder or the browse history or both; for example, the search option may include the favorites folder, the browse history, a browse time range, and the like. By selecting a search option, a search range can be reduced to improve search efficiency.

S102. Acquire a target bookmark website address according to the query keyword and the bookmark website address, where a page to which the target bookmark website address points includes the query keyword.

Specifically, the browser may acquire the target bookmark website address according to the query keyword and the bookmark website address, where the page to which the target bookmark website address points includes the query keyword. A manner of acquiring the target bookmark website address by the browser may be specifically as follows: the browser sends search request information that is associated with both the query keyword and the bookmark website address to a search server, so that the search server loads each bookmark website address according to the search request information. In this case, the search server may determine, by searching, whether a page to which each bookmark website address points includes the query keyword, and return a search result to the browser; the browser may acquire the target bookmark website address according to the search result, where the search server may be a backend server of a search website. Because each bookmark website address is loaded and searched by using the search server, the browser may obtain the target bookmark website address without a need of loading the bookmark website address, thereby reducing network traffic and running pressure of the user terminal.

S103. Display a page label item corresponding to the target bookmark website address.

Specifically, after the target bookmark website address is acquired, the browser may display the page label item corresponding to the target bookmark website address, where the page label item may be a website name of a bookmark website address. For example, if a bookmark website address is "www.baidu.com", a corresponding page label item may be "Baidu". Though some page label items displayed on a search result interface of the browser may not include the query keyword, page content corresponding to the page label items includes the query keyword. Therefore, the page label items that are found are comprehensive and accurate, and the user can quickly find an actually desired website address, thereby improving query efficiency.

It can be seen from the foregoing, in this embodiment of the present invention, a search server determines, by searching, whether a page to which each bookmark website address points includes a query keyword, and returns a search result to a browser, so that the browser may obtain a target bookmark website address according to the search result. Because a page to which the target bookmark website address points includes the query keyword, the target bookmark website address that is finally obtained by searching is more comprehensive and accurate, so that a user can actually find a required website address, thereby improving query efficiency and accuracy. In addition, because the search server can search page content, an uncached bookmark website address does not need to be loaded on a browser side to perform a search, thereby reducing network traffic and running pressure of a user terminal.

Figure 2:
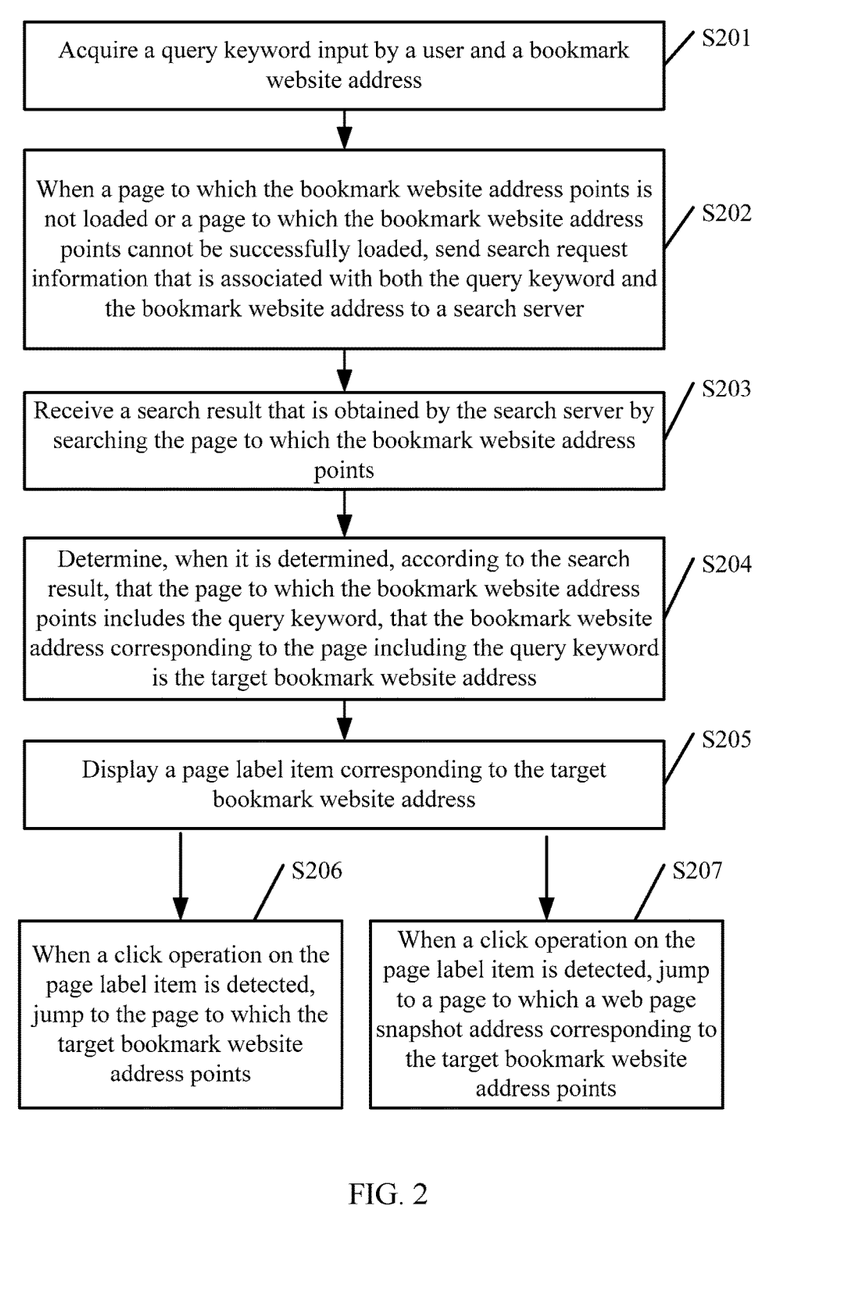
FIG. 2 is a schematic flowchart of another information search method according to an embodiment of the present invention.

Further refer to FIG. 2, which is a schematic flowchart of another information search method according to an embodiment of the present invention. The method includes:

S201. Acquire a query keyword input by a user and a bookmark website address.

Specifically, when the user inputs the query keyword on a search interface of a browser, the browser may acquire the query keyword input by the user and the bookmark website address, where the bookmark website address may be all website addresses in a favorites folder or browse history of the browser or both, and the bookmark website address may also come from another area that is in a user terminal and stores a website address, such as a website address stored in a short message service message. The query keyword may be a query keyword input by the user; for example, the user may input a keyword, such as "smart phone" and "tablet computer", so as to find a bookmark website address that is associated with the keyword "smart phone", "tablet computer", and the like. The browser may further provide a search option for the user, so that the user performs a search in the favorites folder or the browse history or both; for example, the search option may include the favorites folder, the browse history, a browse time range, and the like. By selecting a search option, a search range can be reduced to improve search efficiency.

S202. When a page to which the bookmark website address points is not loaded or a page to which the bookmark website address points cannot be successfully loaded, send search request information that is associated with both the query keyword and the bookmark website address to a search server.

Specifically, when the page to which the bookmark website address points is not loaded or the page to which the bookmark website address points cannot be successfully loaded, the browser may send the search request information that is associated with both the query keyword and the bookmark website address to the search server, so that the search server completes a search function, where the search server may be a backend server of a search website. The browser may choose not to load all bookmark website addresses from the very beginning, and in this case, the browser sends search request information that is associated with both the query keyword and all the bookmark website addresses to the search server. Alternatively, the browser may choose to load all the bookmark website addresses from the very beginning, and in this case, the browser may directly search a page to which a bookmark website address points, where the bookmark website address can be successfully loaded; for a bookmark website address that cannot be successfully loaded, the browser may send, to the search server, search request information that is associated with both the query keyword and the bookmark website address that cannot be successfully loaded.

The search request information that is associated with both the query keyword and the bookmark website address may include: a first search request that carries the query keyword and one bookmark website address, and a second search request that carries the query keyword and all the bookmark website addresses.

In this embodiment of the present invention, the step of sending search request information that is associated with both the query keyword and the bookmark website address to a search server may specifically include:

separately creating, for each of the bookmark website address, the first search request that is associated with the query keyword; and sending the created first search request to the search server, where the first search request includes at least: an address of the search server, one bookmark website address, and the query keyword.

Specifically, all the bookmark website addresses or a bookmark website address that cannot be successfully loaded is traversed, and the first search request that is associated with the query keyword is separately created for each traversed bookmark website address, where the first search request carries a first search string, and the first search string includes at least: a search server address string, a bookmark website address string, a query keyword string, and another related search parameter. For example, a search server address string in a first search string corresponding to a bookmark website address may be http://www.google.com/#, a corresponding query keyword string may be q=browsers, and a format of a bookmark website address string may be "+inurl:bookmark website address url". Therefore, a bookmark website address string corresponding to the bookmark website address may be as follows:

+inurl:http://www.w3.org/2007/03/HTML-WG-charter.html.

The another related search parameter may be a web page coding parameter, such as &ie=UTF-8. Then, the first search string corresponding to the bookmark website address may be as follows:

http://www.google.com/#q=browsers+inurl:http://www.w3.org/2007/03/HTML-WG-charter.html&ie=UTF-8.

The browser separately sends the created first search request to the search server, and the search server may separately parse each first search request to obtain the first search string carried in the first search request, and search, according to the bookmark website address string and the query keyword string in the first search string, the page to which the bookmark website address points.

Alternatively, in this embodiment of the present invention, the step of sending search request information that is associated with both the query keyword and the bookmark website address to a search server may specifically include:

creating, for all bookmark website addresses, a second search request that is associated with the query keyword; and sending the second search request to the search server, where the second search request includes at least: an address of the search server, the query keyword, and all the bookmark website addresses.

Specifically, the second search request may carry a second search string and a header field that is used to store the bookmark website address, where the second search string includes at least: a search server address string, a query keyword string, and another related search parameter. For example, the another search parameter in the second search string may be a web page coding parameter, such as &ie=UTF-8, the search server address string in the second search string may be http://www.google.com.hk/, and the query keyword string in the second search string may be q=browsers. Then, the second search string may be as follows:

http://www.google.com.hk/search?q=browsers&ie=UTF-8.

After the second search string is created, the header field that is used to store the bookmark website address may be created in the HTTP protocol. That is, all bookmark website addresses are stored in the newly created header field. For example, the created header field is TargetURLs:

[http://www.w3.org/2007/03/HTML-WG-charter.html], [http://developer.android.com/about/index.html], . . .

For another example, a structure of the created second search request may be as follows:

GET: http://www.google.comhk/search?q=browsers&ie=UTF-8 HTTP/1.1

Host: www.google.com.hk

Proxy-Connection: keep-alive

Cache-Control: max-age=0

Accept: text/html,application/xhtml+xml,application/xml;q=0.9,*/*;q=0.8

Accept-Encoding: gzip,deflate,sdch

TargetURLs: [http://developer.android.com/about/index.html], [http://www.w3.org/2007/03/HTML-WG-charter.html], [http://en.wikipedia.org/wiki/Webbrowser]

The browser sends the created second search request to the search server, and the search server may parse the second search request to obtain the second search string and the header field that are carried in the second search request, and search, according to the query keyword string in the second search string and the bookmark website address stored in the header field, a page to which each bookmark website address points.

S203. Receive a search result that is obtained by the search server by searching the page to which the bookmark website address points.

Specifically, the search server may search, according to the first search request or the second search request, the page to which the bookmark website address points, and detect whether the page to which the bookmark website address points includes the query keyword, so as to obtain the search result. In this case, the browser may receive the search result returned by the search server. If the search result includes a network address, a page to which the network address points includes the query keyword.

S204. Determine, when it is determined, according to the search result, that the page to which the bookmark website address points includes the query keyword, that the bookmark website address corresponding to the page including the query keyword is the target bookmark website address.

Specifically, when the browser determines, according to the search result, that the page to which the bookmark website address points includes the query keyword, the browser may determine that the bookmark website address corresponding to the page including the query keyword is the target bookmark website address, that is, the page to which the target bookmark website address points necessarily includes the query keyword.

S205. Display a page label item corresponding to the target bookmark website address.

Specifically, after the target bookmark website address is acquired, the browser may display the page label item corresponding to the target bookmark website address, where the page label item may be a website name of a bookmark website address. For example, if a bookmark website address is "www.baidu.com", a corresponding page label item may be "Baidu". Though some page label items displayed on a search result interface of the browser may not include the query keyword, page content corresponding to the page label items includes the query keyword. Therefore, the page label items that are found are comprehensive and accurate, and the user can quickly find an actually desired website address, thereby improving query efficiency.

S206. When a click operation on the page label item is detected, jump to the page to which the target bookmark website address points.

S207. When a click operation on the page label item is detected, jump to a page to which a web page snapshot address corresponding to the target bookmark website address points.

Specifically, the page label item may carry the target bookmark website address. After the user clicks the displayed page label item, the browser may jump to the page to which the target bookmark website address points.

In addition, the page label item may further carry the web page snapshot address corresponding to the target bookmark website address. After the user clicks the displayed page label item, the browser may jump to the page to which the web page snapshot address corresponding to the target bookmark website address points. By using the web page snapshot address, the user can view a page to which a bookmark website address points, where the bookmark website address cannot be successfully loaded by the browser. A specific process of acquiring a web page snapshot address may be as follows: the search server acquires, when the search result is obtained, a web page snapshot address corresponding to each network address from the search result; when the target bookmark website address is acquired according to the search result, the browser replaces the target bookmark website address with a corresponding web page snapshot address, so that a displayed page label item can carry the web page snapshot address corresponding to the target bookmark website address.

It can be seen from the foregoing, in this embodiment of the present invention, a search server determines, by searching, whether a page to which each bookmark website address points includes a query keyword, and returns a search result to a browser, so that the browser may obtain a target bookmark website address according to the search result. Because a page to which the target bookmark website address points includes the query keyword, the target bookmark website address that is finally obtained by searching is more comprehensive and accurate, so that a user can actually find a required website address, thereby improving query efficiency and accuracy. In addition, because the search server can search page content, an uncached bookmark website address does not need to be loaded on a browser side to perform a search, thereby reducing network traffic and running pressure of a user terminal.

Figure 3:
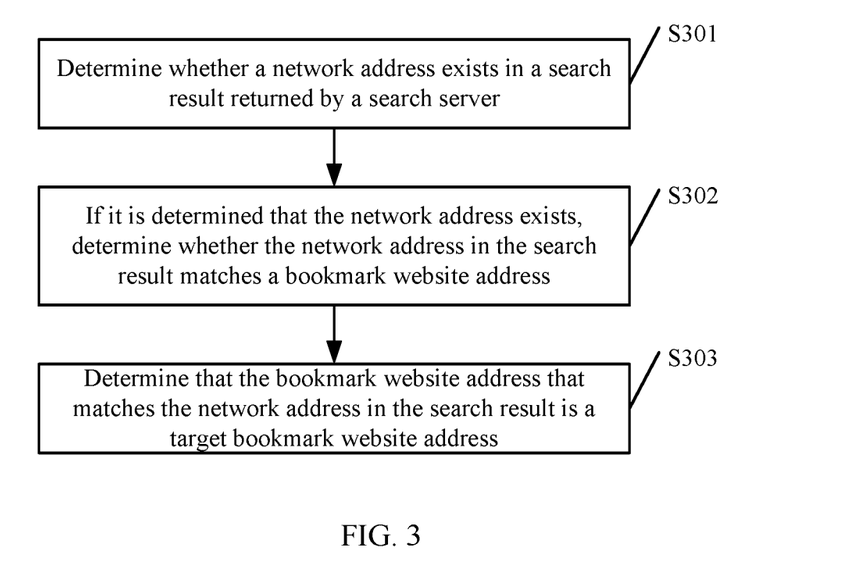
FIG. 3 is a schematic flowchart of a method for determining a target bookmark website address according to an embodiment of the present invention.

Further, refer to FIG. 3, which is a schematic flowchart of a method for determining a target bookmark website address according to an embodiment of the present invention. The method in this embodiment of the present invention may be corresponding to S204 in the embodiment corresponding to FIG. 2. The method in this embodiment of the present invention specifically includes:

S301. Determine whether a network address exists in a search result returned by the search server.

Specifically, after the browser acquires the search result returned by the search server, the browser determines whether a network address exists in the search result returned by the search server, where the network address is an address that is found by the search server and is corresponding to the page including the query keyword.

S302. If it is determined that the network address exists, determine whether the network address in the search result matches the bookmark website address.

Specifically, in step S301, when it is determined that the network address exists, the browser may further determine whether the network address in the search result matches the bookmark website address; if in step S301, it is determined that the website address does not exist, it indicates that no page to which the bookmark website address points includes the query keyword.

S303. Determine that the bookmark website address that matches the network address in the search result is the target bookmark website address.

Specifically, in step S302, when it is determined that the network address in the search result matches the bookmark website address, the browser may determine that the bookmark website address that matches the network address in the search result is the target bookmark website address, that is, the browser acquires the target bookmark website address. If the network address does not match the bookmark website address, it indicates that the page to which the bookmark website address points does not include the query keyword.

In this embodiment of the present invention, by determining whether a network address in a search result matches a bookmark website address, a page label item that meets a requirement can be accurately displayed for user query.

Figure 4:
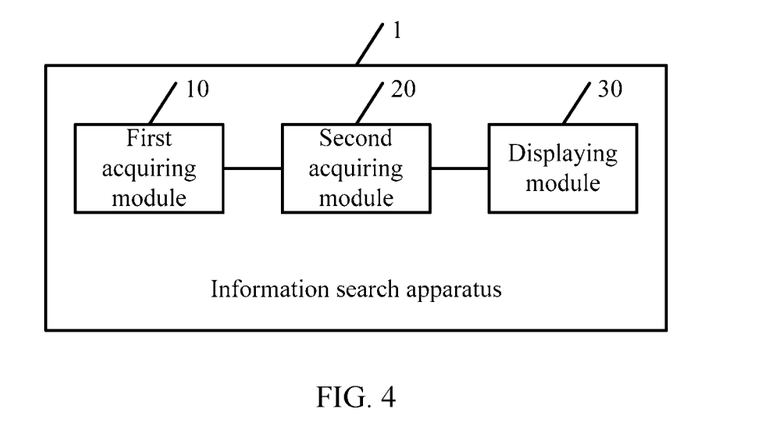
FIG. 4 is a schematic structural diagram of an information search apparatus according to an embodiment of the present invention.

Refer to FIG. 4, which is a schematic structural diagram of an information search apparatus 1 according to an embodiment of the present invention. The information search apparatus 1 may include: a first acquiring module 10, a second acquiring module 20, and a displaying module 30.

The first acquiring module 10 is configured to acquire a query keyword input by a user and a bookmark website address.

Specifically, when the user inputs the query keyword on a search interface of a browser, the first acquiring module 10 may acquire the query keyword input by the user and the bookmark website address, where the bookmark website address may be all website addresses in a favorites folder or browse history of the browser or both, and the bookmark website address may also come from another area that is in a user terminal and stores a website address, such as a website address stored in a short message service message. The query keyword may be a query keyword input by the user; for example, the user may input a keyword, such as "smart phone" and "tablet computer", so as to find a bookmark website address that is associated with the keyword "smart phone", "tablet computer", and the like. The first acquiring module 10 may further provide a search option for the user, so that the user performs a search in the favorites folder or the browse history or both; for example, the search option may include the favorites folder, the browse history, a browse time range, and the like. By selecting a search option, a search range can be reduced to improve search efficiency.

The second acquiring module 20 is configured to acquire a target bookmark website address according to the query keyword and the bookmark website address, where a page to which the target bookmark website address points includes the query keyword.

Specifically, the second acquiring module 20 may acquire the target bookmark website address according to the query keyword and the bookmark website address, where the page to which the target bookmark website address points includes the query keyword. A manner of acquiring a target bookmark website address by the second acquiring module 20 may be specifically as follows: the second acquiring module 20 sends search request information that is associated with both the query keyword and the bookmark website address to a search server, so that the search server loads each bookmark website address according to the search request information. In this case, the search server may determine, by searching, whether a page to which each bookmark website address points includes the query keyword, and return a search result to the second acquiring module 20; the second acquiring module 20 may acquire the target bookmark website address according to the search result, where the search server may be a backend server of a search website. Because each bookmark website address is loaded and searched by using the search server, the second acquiring module 20 may obtain the target bookmark website address without a need of loading the bookmark website address, thereby reducing network traffic and running pressure of the user terminal.

The displaying module 30 is configured to display a page label item corresponding to the target bookmark website address.

Specifically, after the second acquiring module 20 acquires the target bookmark website address, the displaying module 30 may display the page label item corresponding to the target bookmark website address, where the page label item may be a website name of a bookmark website address. For example, if a bookmark website address is "www.baidu.com", a corresponding page label item may be "Baidu". Though some page label items displayed on a search result interface of the displaying module 30 may not include the query keyword, page content corresponding to the page label items includes the query keyword. Therefore, the page label items that are found are comprehensive and accurate, and the user can quickly find an actually desired website address, thereby improving query efficiency.

The information search apparatus 1 provided in this embodiment of the present invention may further include: a first jumping module and a second jumping module.

The first jumping module is configured to, when a click operation on the page label item is detected, implement a jump to the page to which the target bookmark website address points.

Specifically, the page label item may carry the target bookmark website address. After the user clicks the displayed page label item, the first jumping module may implement a jump to the page to which the target bookmark website address points.

The second jumping module is configured to, when a click operation on the page label item is detected, implement a jump to a page to which a web page snapshot address corresponding to the target bookmark website address points.

Specifically, the page label item may further carry the web page snapshot address corresponding to the target bookmark website address. After the user clicks the displayed page label item, the second jumping module may implement a jump to the page to which the web page snapshot address corresponding to the target bookmark website address points. By using the web page snapshot address, the user can view a page to which a bookmark website address points, where the bookmark website address cannot be successfully loaded by the information search apparatus 1. A specific process of acquiring a web page snapshot address may be as follows: the search server acquires, when the search result is obtained, a web page snapshot address corresponding to each network address from the search result; when the target bookmark website address is acquired according to the search result, the information search apparatus 1 replaces the target bookmark website address with a corresponding web page snapshot address, so that a displayed page label item can carry the web page snapshot address corresponding to the target bookmark website address.

The information search apparatus 1 may be disposed in the browser in the user terminal, so that the browser can have a function of the information search apparatus 1.

Figure 5:
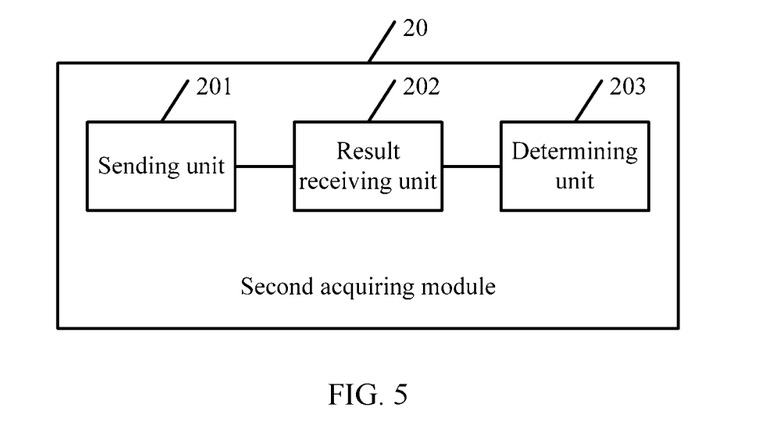
FIG. 5 is a schematic structural diagram of a second acquiring module according to an embodiment of the present invention.

Further, refer to FIG. 5, which is a schematic structural diagram of a second acquiring module 20 according to an embodiment of the present invention. The second acquiring module 20 may include a sending unit 201, a result receiving unit 202, and a determining unit 203.

The sending unit 201 is configured to send, when a page to which the bookmark website address points is not loaded or a page to which the bookmark website address points cannot be successfully loaded, search request information that is associated with both the query keyword and the bookmark website address to the search server.

Specifically, when the page to which the bookmark website address points is not loaded or the page to which the bookmark website address points cannot be successfully loaded, the sending unit 201 may send the search request information that is associated with both the query keyword and the bookmark website address to the search server, so that the search server completes a search function, where the search server may be a backend server of a search website. The information search apparatus 1 may choose not to load all bookmark website addresses from the very beginning, and in this case, the sending unit 201 sends search request information that is associated with both the query keyword and all the bookmark website addresses to the search server. Alternatively, the information search apparatus 1 may choose to load all bookmark website addresses from the very beginning, and in this case, the information search apparatus 1 may directly search a page to which a bookmark website address points, where the bookmark website address can be successfully loaded; for a bookmark website address that cannot be successfully loaded, the sending unit 201 may send, to the search server, search request information that is associated with both the query keyword and the bookmark website address that cannot be successfully loaded.

The result receiving unit 202 is configured to receive a search result that is obtained by the search server by searching the page to which the bookmark website address points.

Specifically, the search server may search, according to the search request information, the page to which the bookmark website address points, and detect whether the page to which the bookmark website address points includes the query keyword, so as to obtain the search result. In this case, the result receiving unit 202 may receive the search result returned by the search server. If the search result includes a network address, a page to which the network address points includes the query keyword.

The determining unit 203 is configured to determine, when it is determined, according to the search result, that the page to which the bookmark website address points includes the query keyword, that the bookmark website address corresponding to the page including the query keyword is the target bookmark website address.

Specifically, when the information search apparatus 1 determines, according to the search result, that the page to which the bookmark website address points includes the query keyword, the determining unit 203 may determine that the bookmark website address corresponding to the page including the query keyword is the target bookmark website address, that is, the page to which the target bookmark website address points necessarily includes the query keyword.

Figure 6:
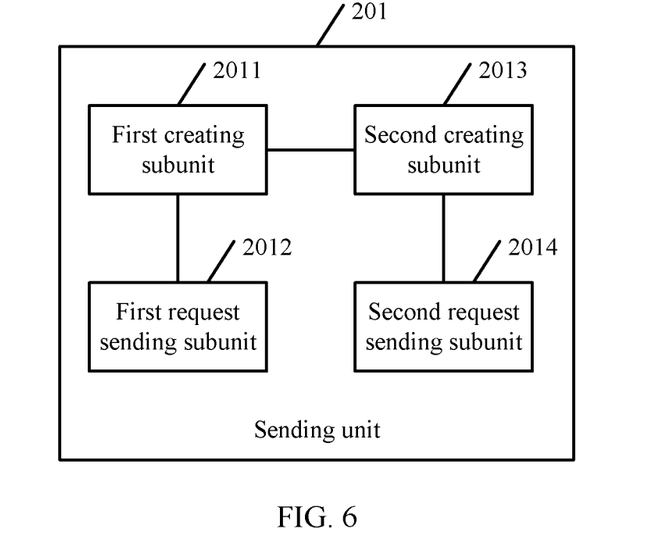
FIG. 6 is a schematic structural diagram of a sending unit according to an embodiment of the present invention.

Further, refer to FIG. 6, which is a schematic structural diagram of a sending unit 201 according to an embodiment of the present invention. The sending unit 201 includes: a first creating subunit 2011, a first request sending subunit 2012, a second creating subunit 2013, and a second request sending subunit 2014.

The first creating subunit 2011 is configured to separately create, for each of the bookmark website address, a first search request that is associated with the query keyword.

Specifically, the first search request includes at least: an address of the search server, one bookmark website address, and the query keyword. The first creating subunit 2011 traverses all the bookmark website addresses or a bookmark website address that cannot be successfully loaded, and separately creates, for each traversed bookmark website address, the first search request that is associated with the keyword, where the first search request carries a first search string, and the first search string includes at least: a search server address string, a bookmark website address string, a query keyword string, and another related search parameter. For example, a search server address string in a first search string corresponding to a bookmark website address may be http://www.google.com/#, a corresponding query keyword string may be q=browsers, and a format of a bookmark website address string may be "+inurl:bookmark website address url". Therefore, a bookmark website address string corresponding to the bookmark website address may be as follows:

+inurl:http://www.w3.org/2007/03/HTML-WG-charter.html.

The another related search parameter may be a web page coding parameter, such as &ie=UTF-8. Then, the first search string corresponding to the bookmark website address may be as follows:

http://www.google.com/#q=browsers+inurl:http://www.w3.org/2007/03/HTML-WG-charter.html &ie=UTF-8.

The first request sending subunit 2012 is configured to separately send the created first search request to the search server.

Specifically, the first request sending subunit 2012 may separately send the created first search request to the search server, and the search server may parse each first search request to obtain a first search string carried in the first search request, and search, according to a bookmark website address string and a query keyword string in the first search string, the page to which the bookmark website address points.

The second creating subunit 2013 is configured to create, for all bookmark website addresses, a second search request that is associated with the query keyword.

Specifically, the second search request includes at least: an address of the search server, the query keyword, and all the bookmark website addresses. The second creating subunit 2013 may create, for all the bookmark website addresses, the second search request that is associated with the query keyword, where the second search request may carry a second search string and a header field that is used to store the bookmark website address. The second search string includes at least: a search server address string, a query keyword string, and another related search parameter. For example, the another search parameter in the second search string may be a web page coding parameter, such as &ie=UTF-8, the search server address string in the second search string may be http://www.google.com.hk/, and the query keyword string in the second search string may be q=browsers. Then, the second search string may be as follows:

http://www.google.com.hk/search?q=browsers&ie=UTF-8.

After the second search string is created, the header field that is used to store the bookmark website address may be created in the HTTP protocol. That is, all bookmark website addresses are stored in the newly created header field. For example, the created header field is TargetURLs:

[http://www.w3.org/2007/03/HTML-WG-charter.html],
[http://developer.android.com/about/index.html], . . .

For another example, a structure of the created second search request may be as follows:

GET: http://www.google.com.hk/search?q=browsers&ie=UTF-8 HTTP/1.1
Host: www.google.com.hk
Proxy-Connection: keep-alive
Cache-Control: max-age=0
Accept: text/html,application/xhtml+xml,application/xml;q=0.9,*/*;q=0.8
Accept-Encoding: gzip,deflate,sdch
TargetURLs: [http://developer.android.com/about/index.html], [http://www.w3.org/2007/03/HTML-WG-charter.html], [http://en.wikipedia.org/wiki/Webbrowser]

The second request sending subunit 2014 is configured to send the second search request to the search server.

Specifically, the second request sending subunit 2014 may send the created second search request to the search server, and the search server may parse the second search request to obtain the second search string and the header field that are carried in the second search request, and search, according to the query keyword string in the second search string and the bookmark website address stored in the header field, a page to which each bookmark website address points.

The information search apparatus 1 may control the first creating subunit 2011 or the second creating subunit 2013 or both to perform an operation. For example, when the first creating subunit 2011 performs an operation, the second creating subunit 2013 stops working; or, when the second creating subunit 2013 performs an operation, the first creating subunit 2011 stops working; or, the first creating subunit 2011 performs a corresponding operation on a part of bookmark website addresses, and the second creating subunit 2013 performs a corresponding operation on another part of the bookmark website addresses.

Figure 7:
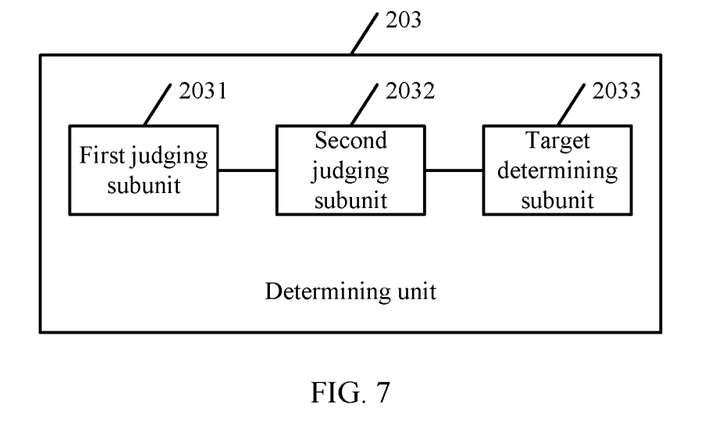
FIG. 7 is a schematic structural diagram of a determining unit according to an embodiment of the present invention.

Further, refer to FIG. 7, which is a schematic structural diagram of a determining unit 203 according to an embodiment of the present invention. The determining unit 203 may include: a first judging subunit 2031, a second judging subunit 2032, and a target determining subunit 2033.

The first judging subunit 2031 is configured to determine whether a network address exists in the search result returned by the search server, where the network address is an address that is found by the search server and is corresponding to the page including the query keyword.

Specifically, after the search result returned by the search server is acquired, the first judging subunit 2031 may determine whether a network address exists in the search result returned by the search server, where the network address is an address that is found by the search server and is corresponding to the page including the query keyword.

The second judging subunit 2032 is configured to determine, if the first judging subunit 2031 determines that the network address exists, whether the network address in the search result matches the bookmark website address.

Specifically, when the first judging subunit 2031 determines that the network address exists, the second judging subunit 2032 may further determine whether the network address in the search result matches the bookmark website address; if the first judging subunit 2031 determines that the network address does not exist, it indicates that no page to which the bookmark website address points includes the query keyword.

The target determining subunit 2033 is configured to determine that the bookmark website address that matches the network address in the search result is the target bookmark website address.

Specifically, when the second judging subunit 2032 determines that the network address in the search result matches the bookmark website address, the target determining subunit 2033 may determine the bookmark website address that matches the network address in the search result is the target bookmark website address, that is, the second acquiring module 20 acquires the target bookmark website address. If the network address does not match the bookmark website address, it indicates that the page to which the bookmark website address points does not include the query keyword.

It can be seen from the foregoing, in this embodiment of the present invention, a search server determines, by searching, whether a page to which each bookmark website address points includes a query keyword, and returns a search result to a browser, so that the browser may obtain a target bookmark website address according to the search result. Because a page to which the target bookmark website address points includes the query keyword, the target bookmark website address that is finally obtained by searching is more comprehensive and accurate, so that a user can actually find a required website address, thereby improving query efficiency and accuracy. In addition, because the search server can search page content, an uncached bookmark website address does not need to be loaded on a browser side to perform a search, thereby reducing network traffic and running pressure of a user terminal.

An embodiment of the present invention further provides a computer storage medium, where the computer storage medium stores a program, and a part of or all steps of the information search method recorded in the method embodiments in FIG. 1 to FIG. 3 are included when the program in executed.

Figure 8:
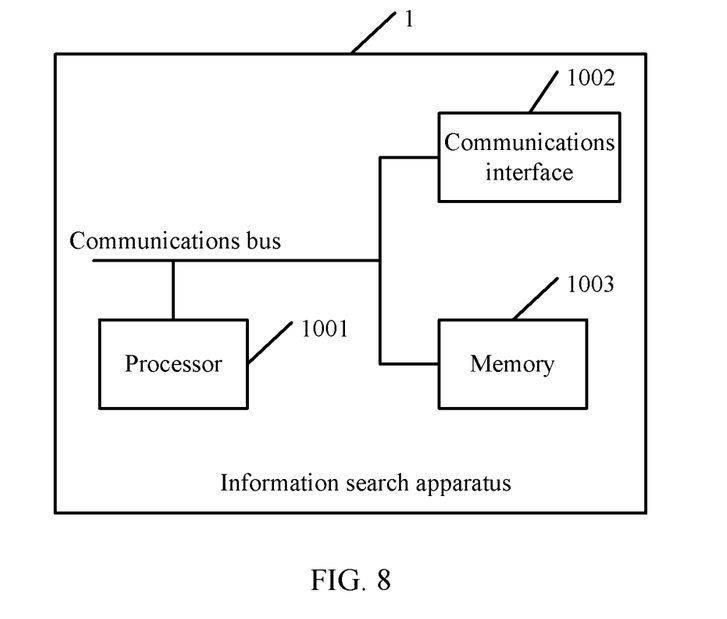
FIG. 8 is a schematic structural diagram of another information search apparatus according to an embodiment of the present invention.

Further, refer to FIG. 8, which is a schematic structural diagram of another information search apparatus 1 according to an embodiment of the present invention. The information search apparatus 1 may include a processor 1001, a communications interface 1002, and a memory 1003 (a quantity of processors 1001 in the information search apparatus 1 may be one or more, and one processor 1001 is used as an example in FIG. 8). In some embodiments of the present invention, the processor 1001, the communications interface 1002, and the memory 1003 may be connected by using a communications bus or in another manner, where a connection by using a communications bus is used as an example in FIG. 8.

The communications interface 1002 is configured to communicate with a search server.

The memory 1003 is configured to store a program.

The processor 1001 is configured to execute the program, so as to implement:

acquiring a query keyword input by a user and a bookmark website address;

acquiring a target bookmark website address according to the query keyword and the bookmark website address, where a page to which the target bookmark website address points includes the query keyword; and displaying a page label item corresponding to the target bookmark website address.

When executing a step of acquiring a target bookmark website address according to the query keyword and the bookmark website address, the processor 1001 is specifically configured to:

when a page to which the bookmark website address points is not loaded or a page to which the bookmark website address points cannot be successfully loaded, send search request information that is associated with both the query keyword and the bookmark website address to the search server;

receive a search result that is obtained by the search server by searching the page to which the bookmark website address points; and determine, when it is determined, according to the search result, that the page to which the bookmark website address points includes the query keyword, that the bookmark website address corresponding to the page including the query keyword is the target bookmark website address.

When executing a step of sending search request information that is associated with both the query keyword and the bookmark website address to the search server, the processor 1001 is specifically configured to:

separately create, for each of the bookmark website address, a first search request that is associated with the query keyword; and separately send the created first search request to the search server, where the first search request includes at least: an address of the search server, one bookmark website address, and the query keyword.

When executing a step of sending search request information that is associated with both the query keyword and the bookmark website address to the search server, the processor 1001 is specifically configured to:

create, for all bookmark website addresses, a second search request that is associated with the query keyword; and send the second search request to the search server, where the second search request includes at least: an address of the search server, the query keyword, and all the bookmark website addresses.

When executing a step of determining, when it is determined, according to the search result, that the page to which the bookmark website address points includes the query keyword, that the bookmark website address corresponding to the page including the query keyword is the target bookmark website address, the processor 1001 is specifically configured to:

determine whether a network address exists in the search result returned by the search server, where the network address is an address that is found by the search server and is corresponding to the page including the query keyword; and if it is determined that the network address exists, determine whether the network address in the search result matches the bookmark website address; and determine that the bookmark website address that matches the network address in the search result is the target bookmark website address.

The processor 1001 is further configured to:

when a click operation on the page label item is detected, implement a jump to the page to which the target bookmark website address points; or when a click operation on the page label item is detected, implement a jump to a page to which a web page snapshot address corresponding to the target bookmark website address points.

It can be seen from the foregoing, in this embodiment of the present invention, a search server determines, by searching, whether a page to which each bookmark website address points includes a query keyword, and returns a search result to a browser, so that the browser may obtain a target bookmark website address according to the search result. Because a page to which the target bookmark website address points includes the query keyword, the target bookmark website address that is finally obtained by searching is more comprehensive and accurate, so that a user can actually find a required website address, thereby improving query efficiency and accuracy. In addition, because the search server can search page content, an uncached bookmark website address does not need to be loaded on a browser side to perform a search, thereby reducing network traffic and running pressure of a user terminal.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), a random access memory (Random Access Memory, RAM), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. An information search method performed by a user device comprising a local memory, the method comprising:
   acquiring a query keyword input by a user and at least one bookmark website address;
   acquiring at least one target bookmark website address according to the query keyword and the at least one bookmark website address, wherein at least one page to which the at least one target bookmark website address points comprises the query keyword; and
   displaying a page label item corresponding to the at least one target bookmark website address,
   wherein the acquiring at least one target bookmark website address according to the query keyword and the at least one bookmark website address comprises:
   when a page to which one of the at least one bookmark website address points is not loaded on the local memory of the user device or a page to which one of the at least one bookmark website address points cannot be successfully loaded from the local memory of the user device, sending search request information that is associated with both the query keyword and the at least one bookmark website address to a search server;
   receiving a search result that is obtained by the search server by searching the at least one page to which the at least one bookmark website address points; and
   determining, when it is determined, according to the search result, that the at least one page to which the at least one bookmark website address points comprises the query keyword, that the at least one bookmark website address corresponding to the at least one page comprising the query keyword is the at least one target bookmark website address.

2. The method according to claim 1, wherein the sending search request information that is associated with both the query keyword and the bookmark website address to a search server comprises:
   separately creating, for each of the at least one bookmark website address, a first search request that is associated with the query keyword; and
   separately sending the created first search request to the search server, wherein
   the first search request comprises at least: an address of the search server, one bookmark website address, and the query keyword.

3. The method according to claim 1, wherein the sending search request information that is associated with both the query keyword and the bookmark website address to the search server comprises:
   creating, for all the at least one bookmark website addresses, a second search request that is associated with the query keyword; and
   sending the second search request to the search server, wherein the second search request comprises at least: an address of the search server, the query keyword, and all the bookmark website addresses.

4. The method according to claim 1, wherein the determining, when it is determined, according to the search result, that the page to which the bookmark website address points comprises the query keyword, that the bookmark website address corresponding to the page comprising the query keyword is the target bookmark website address comprises:
   determining whether a network address exists in the search result returned by the search server, wherein the network address is an address that is found by the search server and is corresponding to the page comprising the query keyword;
   if it is determined that the network address exists, determining whether the network address in the search result matches the bookmark website address; and
   determining that the bookmark website address that matches the network address in the search result is the target bookmark website address.

5. The method according to claim 1, after the displaying the page label item corresponding to the target bookmark website address, further comprising:
   when a click operation on the page label item is detected, jumping to the page to which the target bookmark website address points; or
   when a click operation on the page label item is detected, jumping to a page to which a web page snapshot address corresponding to the target bookmark website address points.

6. A non-transitory computer readable storage medium, wherein the computer readable storage medium stores a program for performing an information search method at a user device including a processor and a communications interface, wherein when the program is executed by the processor of the user device, the user device is configured to perform steps comprising:
   acquiring a query keyword input by a user and at least one bookmark website address;
   acquiring at least one target bookmark website address according to the query keyword and the at least one bookmark website address, wherein at least one page to which the at least one target bookmark website address points comprises the query keyword; and
   displaying a page label item corresponding to the at least one target bookmark website address,
   wherein the acquiring at least one target bookmark website address according to the query keyword and the at least one bookmark website address comprises:
   when a page to which one of the at least one bookmark website address points is not loaded locally or a page to which one of the at least one bookmark website address points cannot be successfully loaded locally, sending search request information that is associated with both the query keyword and the at least one bookmark website address to a search server;
   receiving a search result that is obtained by the search server by searching the at least one page to which the at least one bookmark website address points; and
   determining, when it is determined, according to the search result, that the at least one page to which the at least one bookmark website address points comprises the query keyword, that the at least one bookmark website address corresponding to the at least one page comprising the query keyword is the at least one target bookmark website address.

7. An information search apparatus, comprising: a processor, a communications interface, and a memory, wherein the communications interface is configured to communicate with a search server;

the memory is configured to store a program; and the processor is configured to execute the program, so as to implement steps comprising:

acquiring a query keyword input by a user and at least one bookmark website address;

acquiring at least one target bookmark website address according to the query keyword and the at least one bookmark website address, wherein at least one page to which the at least one target bookmark website address points comprises the query keyword; and displaying a page label item corresponding to the at least one target bookmark website address, wherein, when a page to which one of the at least one bookmark website address points is not loaded locally or a page to which one of the at least one bookmark website address points cannot be successfully loaded locally, the processor is further configured to:

send search request information that is associated with both the query keyword and the at least one bookmark website address to the search server;

receive a search result that is obtained by the search server by searching the at least one page to which the at least one bookmark website address points; and determine, when it is determined, according to the search result, that the at least one page to which the at least one bookmark website address points comprises the query keyword, that the at least one bookmark website address corresponding to the at least one page comprising the query keyword is the at least one target bookmark website address.

8. The apparatus according to claim 7, wherein the processor is specifically configured to:

separately create, for each of the at least one bookmark website address, a first search request that is associated with the query keyword; and separately send the created first search request to the search server, wherein the first search request comprises at least: an address of the search server, one bookmark website address, and the query keyword.

9. The apparatus according to claim 7, wherein the processor is further configured to:

create, for all the at least one bookmark website addresses, a second search request that is associated with the query keyword; and send the second search request to the search server, wherein the second search request comprises at least: an address of the search server, the query keyword, and all the bookmark website addresses.

10. The apparatus according to claim 7, wherein the processor is further configured to:

determine whether a network address exists in the search result returned by the search server, wherein the network address is an address that is found by the search server and is corresponding to the page comprising the query keyword; and if it is determined that the network address exists, determine whether the network address in the search result matches the bookmark website address; and determine that the bookmark website address that matches the network address in the search result is the target bookmark website address.

11. The apparatus according to claim 7, wherein the processor is further configured to:

when a click operation on the page label item is detected, implement a jump to the page to which the target bookmark website address points; or when a click operation on the page label item is detected, implement a jump to a page to which a web page snapshot address corresponding to the target bookmark website address points.

\* \* \* \* \*